(12) United States Patent
Osuna Sanchez et al.

(10) Patent No.: US 11,337,428 B2
(45) Date of Patent: May 24, 2022

(54) **FUNCTIONALIZED EXTRACT OF *LARREA TRIDENTATA* WITH BIOCIDAL ACTIVITY**

(71) Applicants: Juan Genaro Osuna Sanchez, Saltillo (MX); Yolanda Sanchez Salazar, Saltillo (MX); Yolanda Osuna Sanchez, Saltillo (MX)

(72) Inventors: Juan Genaro Osuna Sanchez, Saltillo (MX); Yolanda Sanchez Salazar, Saltillo (MX); Yolanda Osuna Sanchez, Saltillo (MX)

(*) Notice: Subject to any disclaimer, the term of this patent is extended or adjusted under 35 U.S.C. 154(b) by 694 days.

(21) Appl. No.: 16/321,762

(22) PCT Filed: Aug. 10, 2018

(86) PCT No.: PCT/MX2018/050019
§ 371 (c)(1),
(2) Date: Jan. 29, 2019

(87) PCT Pub. No.: WO2019/164388
PCT Pub. Date: Aug. 29, 2019

(65) Prior Publication Data
US 2021/0345620 A1  Nov. 11, 2021

(30) Foreign Application Priority Data
Feb. 21, 2018 (MX) .................. MX/a/2018/002189

(51) Int. Cl.
*A01N 65/08* (2009.01)
*A01N 25/02* (2006.01)
*A01N 31/16* (2006.01)
*A01N 35/06* (2006.01)
*A01P 3/00* (2006.01)

(52) U.S. Cl.
CPC ............ *A01N 65/08* (2013.01); *A01N 25/02* (2013.01); *A01N 31/16* (2013.01); *A01N 35/06* (2013.01); *A01P 3/00* (2021.08)

(58) Field of Classification Search
None
See application file for complete search history.

(56) References Cited

U.S. PATENT DOCUMENTS

| | | | |
|---|---|---|---|
| 4,774,229 A * | 9/1988 | Jordan ................... | A61K 33/34 514/25 |
| 5,989,555 A * | 11/1999 | Gnabre ................... | C07C 43/23 514/766 |
| 11,278,026 B2 * | 3/2022 | Saavedra Aguilar .. | A01N 65/00 |
| 2005/0042233 A1 * | 2/2005 | Marrs ................... | A61K 31/355 514/474 |
| 2005/0042306 A1 * | 2/2005 | Marrs ................... | A61K 8/9789 424/769 |
| 2005/0042309 A1 * | 2/2005 | Marrs ................... | A61K 36/80 424/769 |
| 2005/0123560 A1 | 6/2005 | Sinnott | |

FOREIGN PATENT DOCUMENTS

| | | | |
|---|---|---|---|
| MX | 2011013349 | | 6/2013 |
| MX | 2011013349 A | * | 6/2013 |
| MX | 2013001546 | | 8/2014 |
| MX | 2015004656 | | 5/2016 |

OTHER PUBLICATIONS

Manda, G. et al., "Nordihydroguaiaretic acid: from herbal medicine to clinical development for cancer and chronic diseases," Frontiers in Pharmacology, vol. 11, Article 151, pp. 1-21 (2020).*
Moreno-Limón, S. et al., "Efecto Antifúngico De Extractos De Gobernadora (*Larrea tridentata* L.) Sobre La Inhibición in Vitro De Aspergillus flavus y Penicillium sp", 2011Polibotánica, N° 32, Páginas 193-205, ISSN 1405-2768.
Valero Galván, J. et al., "Efecto de los extractos acuosos de hojas de plantas de gobernadora (*Larrea tridentata*), hojasen (*Flourensia cernua*) y encino (*Quercus pungens*), sobre el crecimiento micelial in vitro de hongos fitopatógenos", 2014, Acta Universitaria, vol. 24, N° 5, pp. 13-19, ISSN 0188-6266.
Mojica-Marín, V. et al., "In vitro antifungal activity of "Gobernadora" (*Larrea tridentata* (D.C.) Coville) against Phytophthora capsici Leo", 2011, African Journal of Agricultural Research, vol. 6, N° 5, Páginas 1058-1066, ISSN 1991-637X.
Penuelas-Rubio, O. et al., "Larrea tridentata extracts as an ecological strategy against Fusarium oxysporum radicis-lycopersici in tomato plants under greenhouse conditions", Mexican Journal of Phytopathology, Sep. 2017, pp. 360-376.
Chavez-Solis, A. et al., Evaluation of Larrea tridentata (D.C.) Coville Extract in the Control Powdery Mildew of Melon (*Podosphaera xanthii*), Revista Chapingo Serie Zonas Aridas, vol. XIII, No. 2, 2014, pp. 103-113.
Vargas-Arispuro, I. et al., Antifungal lignans from the creosotebush (*Larrea tridentata*), Industrial Crops and Products 22, 2005, pp. 101-107.
International Search Report, PCT/MX2018/050019, dated Aug. 10, 2018.

* cited by examiner

*Primary Examiner* — John Pak
(74) *Attorney, Agent, or Firm* — Emerson, Thomson & Bennett, LLC; Roger D. Emerson; Peter R. Detorre

(57) ABSTRACT

An aqueous extract of *Larrea tridentata* useful in the control of phytopathogens that attack commercial crops, functionalized to increase the ratio of quinones of nordihydroguaiaretic acid.

6 Claims, 9 Drawing Sheets

FUNCTIONALIZED EXTRACT OF *LARREA TRIDENTATA* WITH BIOCIDAL ACTIVITY

This non-provisional application claims priority to PCT Application Serial No. PCT/MX2018/050019, filed on Aug. 10, 2018 and having a priority date of Feb. 21, 2018.

TECHNICAL FIELD

The present invention relates to an aqueous extract of *Larrea tridentata* with remarkable biocidal activity and, particularly it relates to a novel functionalized aqueous extract of *Larrea tridentata* of very low concentration, in which the quinolated forms of nordihydroguaiaretic acid predominate (Quinones of NDGA). Also, the present invention relates to the use of said extract in low concentrations for eradication of phytopathogenic organisms in commercial crops.

BACKGROUND

The plant *Larrea tridentata*, commonly known as a governor or creosote bush, is a plant of the Zygophyllaceae family. It is very common in deserts of North America, from Bajío area in Mexico, to the northernmost part of the Chihuahuan desert. It is known as a governor because of her ability to inhibit the development of other plants around its and thus obtain more water. This plant has a relevant commercial importance, since it can be used as a raw material for obtaining adhesives, pigments, food antioxidants, footwear greases, lubricating oils, varnishes, saline formations descaler in boilers, pharmaceutical and agricultural products. Traditionally, this plant was used as a remedy for conditions in the urinary tract and as antiseptic for general use; however, the advent of new drugs has led to disuse.

Among the uses of this plant, one of the most promising today is as raw material to produce agricultural products, particularly to produce biological control compounds of phytopathogenic agents. This is because the plant contains in its stems and leaves as one of its main components, the nordihydroguaiaretic acid (NDGA), which in in vitro and in vivo studies has proved to be a substance with a remarkable antimicrobial effect. However, the extraction of said compound has led to several technical problems, since the concentrations of NDGA obtained by conventional extraction methods are very low; which results in underpowered extracts that require to be used in large quantities to control diseases in crops.

In order to avoid the use of large quantities of *Larrea tridentata*, it has been chosen to obtain its extracts using organic solvents such as alcohol, acetone, hexane, methanol or chloroform. The use of said solvents significantly increases the proportion of NDGA obtained with respect to the weight of the vegetable material used; however, the use of these solvents leads to several complications, as these remain as remnants in the final products and are therefore dispersed to the environment, which leads to residual toxicity phenomena or pollution of the water table.

This type of extracts is described, for example, in A A, Chaparro-Encinas L A; HERNÁNDEZ-RODRÍGUEZ, S. E. *Larrea tridentata* extracts as an ecological strategy against *Fusarium oxysporum* radicis-lycopersici in tomato plants under greenhouse conditions. Pathology, vol. 35, no 3, p. 360-376. In said Article an ethanolic extract of *Larrea tridentata* is revealed, obtained by macerating 1 Kg of the plant in 10 L of an ethanol:water solution 7:3 (v/v) for 8 days at room temperature and in the dark. Subsequently a filtration with gauze and filter paper is made. The filtrate is subjected to an evaporation under reduced pressure and the extracted solid (the alcoholic extract) and the supernatant are frozen at −45° C. to be lyophilized. This process can in no way be considered as an aqueous extract, since due to its obtaining process are left remnants of the used solvent. The above was corroborated since the ethanolic extract was compared with a conventional aqueous extract and in said Article it was concluded that the use of ethanol is what allows to transport the plant active compounds. However, even so, large quantities of the aerial parts of *Larrea tridentata* are required in order to obtain an active extract.

Article VALERO GALVÁN, José; GONZÁLEZ DÍAZ, César Alejandro; GONZALEZ FERNANDEZ, Raquel. Effect of aqueous extracts of leaves of governor plants (*Larrea tridentata*), leaves of (*Flourensia cernua*) and oak (*Quercus pungens*), on the in vitro mycelial growth of phytopathogenic fungi. University Act, 2014, vol. 24, no 5. Describes a comparative study of several aqueous extracts of various plants and in this work the aqueous extract of *Larrea tridentata* is obtained by soaking the plant leaves for 3 hours in water. Said extract only contains the water soluble components of the plant, but as is well known to a technician with average knowledge in the field, this type of extraction does not allow to obtain most of the active compounds, since the waxy layer that covers the sheet prevents the diffusion of active compounds into the water. Likewise, in said Article it was concluded that the aqueous extract thus obtained was the one that presented the worst behavior, so it corroborates the fact that extraction with organic solvents is necessary to obtain functional extracts from the plant.

Article CHÁVEZ-SOLÍS, Aaron Leobardo, et al. CONTROL OF THE MELON POWDERY MILDEW (*Podosphaera xanthii*) THROUGH THE USE OF EXTRACT OF *Larrea tridentata* (DC) Coville (L.). Chapingo Magazine, Arid Zones Series, 2014, vol. 13, no 2, describes the use of aqueous extract of *Larrea tridentata* in controlling the melon powdery mildew. In said Article it is mentioned that although the advance of the infection can be delayed by applying the aqueous extract, it is preferred to use the hydroalcoholic and ethanolic extracts to combat the infection since the aqueous extract is not sufficiently active.

Finally, in Article VARGAS-ARISPURO, I., et al. Antifungal lignans from the creosotebush (*Larrea tridentata*). Industrial Crops and Products, 2005, vol. 22, no 2, p. 101-107, describes the use of ethanolic extracts of *Larrea tridentata* as fungal control agents of the genus *Aspergillus*. In said Article it is revealed that the antifungal effect is due to the presence of the nordihydroguaiaretic acid and its methylated form. However, the extracts are suspended in water and divided into ethyl ether, ethyl acetate and n-butanol, so when applied, they contain traces of all the above mentioned solvents, therefore there is a residual toxicity due to the addition of the organic solvents.

None of the above mentioned extracts can be considered as an environmentally friendly product since the solvent residues that accompany them can cause residual toxicity in soils. In addition, the few aqueous extracts available, even when they have a plant concentration above 50%, are not very active and do not allow the correct control of phytopathogenic agents, so they should be used in combination with other biocidal compounds.

In view of the above problems, it is necessary to provide an aqueous extract of *Larrea tridentata*, with a remarkable biocidal effect even at low doses, in which the components of the extract are functionalized in such a way that the biocidal effect is significantly increased, without require the use of large amounts of plant material to obtain the extract, or to combine with other biocidal agents.

SUMMARY

In order to overcome the disadvantages of the extracts of *Larrea tridentata* commercially available, the present invention aims to provide a novel aqueous extract of *Larrea tridentata* of low concentration, whose components are functionalized to enhance its biocidal effect.

A further object of the present invention is to provide an aqueous extract of *Larrea tridentata* that can be used in very low concentrations to eradicate infestations of fungi and phytopathogenic bacteria in commercial crops.

It is also an object of the present invention to provide an aqueous extract of *Larrea tridentata* that does not have remnants of organic solvents used during the extraction process.

A further object of the present invention is to provide an aqueous extract of *Larrea tridentata* that does not release organic solvents to the environment.

Another object of the present invention is to provide an aqueous extract of *Larrea tridentata* that can be applied at very low concentrations on crops without losing its biocidal effect.

The above mentioned objects, as well as others and the advantages of the present invention, will become apparent from the following detailed description thereof.

BRIEF DESCRIPTION OF THE DRAWINGS

The accompanying drawings in the following description illustrate various embodiments of the present disclosure.

DETAILED DESCRIPTION

Figure 1:
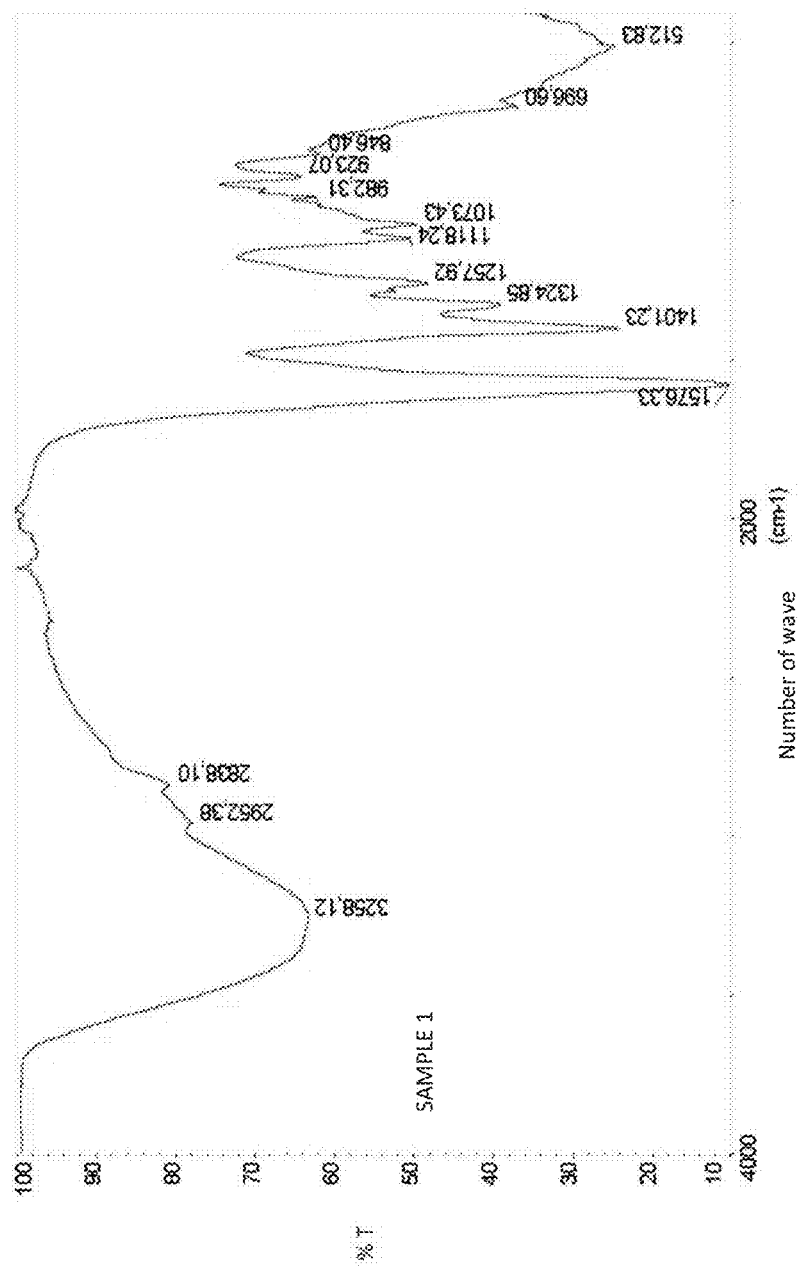
FIG. 1 shows an IR spectroscopy of the extract of the present invention.

The present invention provides a novel aqueous extract of *Larrea tridentata* with a concentration from 3 to 5% that is functionalized with EDTA disodium salt to obtain a quinone-rich extract of nordihydroguaiaretic acid (NDGA), which have cytostatic and antimicrobial properties due to its ability to act as potent inhibitors of the electronic transport chain, as decouplers of oxidative phosphorylation, as intercalating agents in the DNA helix, as reductive alkylation agents of biomolecules and as producers of oxygen free radicals. The extract of the present invention in infrared spectroscopy has a stretching band of the C=O group corresponding to a quinone in 1576 and has a pH from 9.2 to 10; said extract has a remarkable biocidal effect even below a 1:400 dilution. Moreover, the extract of the present invention retains its stability and biocidal power for a period of at least 2 years, without the need for the inclusion of any preservation agent.

The extract of the present invention only uses water as the extraction medium and the addition of any type of organic solvent is not required during its production process. The method of obtaining the extract of the present invention comprises the following steps:

1) Wash leaves and stems of *Larrea tridentata* with water for a period from 15 to 60 minutes;

2) Dry the plant material at temperature from 30° C. to 60° C. for 18 to 36 hours;

3) Adding the dry plant material to a water agitation tank, at rate from 3 to 5% w/v, heating the mixture from 60 to 100° C. for a period from 30 to 75 minutes;

4) Separate the extract obtained by filtering it through a filter from 5 to 10 micrometers and;

5) Transfer the filtrate to a stirred tank reactor and add from 3 to 50 grams of disodium EDTA by liter of extract, maintaining an agitation from 150 to 300 rpm for a period from 15 to 120 minutes maintaining the temperature from 60° C. to 100° C. to obtain an aqueous extract with a concentration from 3 to 5% of *Larrea tridentata*, rich in quinones of ANDG, which has a pH from 9.2 to 10.

The extract obtained by the methodology above described has a good stability and can be used by diluting it up to a ratio of 1:400 before use. In said dilution it is active enough to eliminate from 90% to 95% of infections established by phytopathogens such as Rust (*Hemileia vastatrix*), powdery mildew (*Leveillula taurica, Erysiphe cichoracearum, uncinula necator*), damping-off (*Fusarium* sp.), rot (*Fusarium* sp.), mildew (*Peronospora* sp. *Unicinula necator*) and pink root (*Phoma terrestres*), among others; in particular the extract of the present invention is effective controlling *Botrytis* spp, *Podosphaera xanthii, Alternaria* sp., *Colletotrichum* sp., *Aspergillus flavus, Rhizotocnia* sp., *Oidium* sp., *Mycosphaerella fijiensis, Phytophthora* spp, *Sphaceloma perseae, Sphaceloma necator, Agrobacterium* spp, *Phyllachora gratissima, Cercospora purpurea, Cercospora capsici, Cephalereus virescens, Capnodium* spp, *Nectria galligena, Rosellinia* spp, *Aspergillus niger, Botrytis* spp, *Penicillium* spp, *Puccinia* spp, *Pyrenochaeta terrestris, Sclerotinia* spp, *Stemphylium vesicarium, Uroccystis cepulae, Pythium* spp, *Thielaviopsis* spp, *Xanthomonas* spp, *Pectobacterium* spp, *Plasmodiophora brassicae, Erysiphe cruciferarum, Mycosphaerella capsellae, Mycosphaerella brassicicola, Mycosphaerella melonis, Mycosphaerella fragarie, Verticillium* spp, *Albugo candida, Sphaeroteca* spp, *Phoma* spp, *Phyllosticta citricarpa, Diaporthe citri, Elsinoe australis* and, *Ralstonia* spp. Likewise, the extract above described is useful in the control of *Pucciniastrum americanum* and *Botrytis cinerea* and in phytopathogenic bacteria such as *Pseudomona* sp and *Erwinia* sp.

Furthermore, the functionalized aqueous extract of the present invention can be stored for at least 2 years without losing its biocidal properties, without requiring the addition of any type of preservative agents, since the same functionalization of the extract makes it more stable because it significantly increases the chemical stability of the compounds present in it.

In order to unequivocally demonstrate the above mentioned biocidal properties, the presence of ANDG quinones and the stability of the aqueous extract of *Larrea tridentata* functionalized with disodium EDTA, some examples of preferred embodiments of the present invention, as well as the implementation thereof, are shown below.

Example 1. Obtaining the Functionalized Aqueous Extract

Leaves and stems were collected from adult plants of *Larrea tridentata*, which were stripped of residues and washed with water to remove any substance deposited on them. Later they were placed inside a dry heat stove at oscillating temperature from 30° C. to 60° C. until the leaves and stems lost all their moisture. The dry plant material was added to a stirring tank at rate of 4% per liter of water used to fill the tank, taking the mixture at temperature from 60° C. to 100° C. for a period of 1 hour. The extract obtained was filtered through an industrial filter with a pore size of 7 micrometers. The filtrate was transferred to a stirring tank and disodium EDTA was added, until reddish-brown color appeared, during this process constant stirring of 200 rpm and temperature of 80° C. was maintained.

After the addition of EDTA, a functionalized aqueous extract was obtained that presented a reddish-brown color with pH from 9.2 to 10. This extract was stored in opaque plastic containers and part of the manufactured lot was allocated for characterization tests, while another was used to carry out in vitro and in vivo tests.

Example 2. Characterization Tests

To characterize the extract obtained, samples of extract functionalized with disodium EDTA (sample 1) and samples of aqueous extract without functionalization (sample 2), were subjected to an infrared spectroscopy test. The test results are shown in FIGS. 1 and 2.

Figure 2:
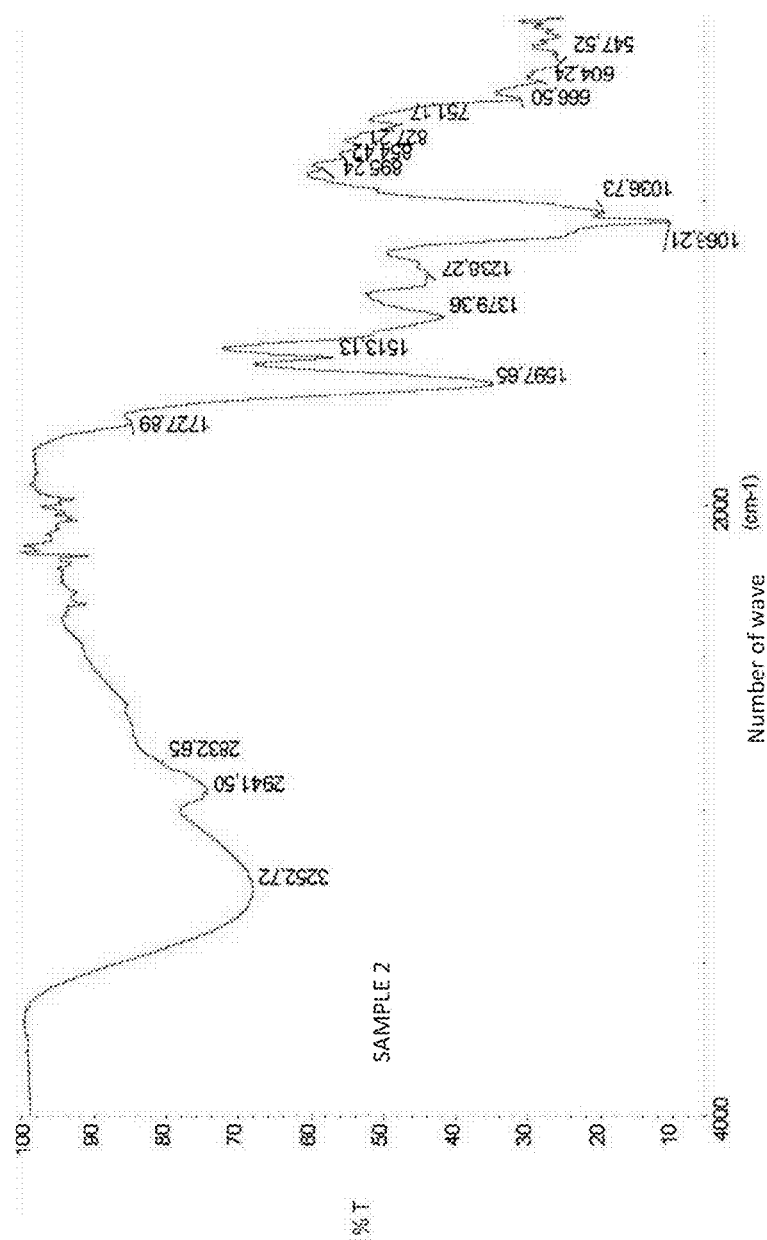
FIG. 2 shows an IR spectroscopy of a conventional aqueous extract of *Larrea tridentata*.

As can be seen in FIG. 1 corresponding to sample 1, a band corresponding to a stretching band from the group C=O of a quinone in 1576 is observed; FIG. 2 shows a band corresponding to a stretching band C=O of a quinone in 1597, but of a lower intensity than that obtained with sample 1. The above shows that with the addition of disodium EDTA, the concentration of quinones of the NDGA is increased. On the other hand, the band at 1063 in sample 1 corresponded to C—OH stretching vibrations of phenols, which almost disappeared in sample 2, which indicates that the concentration of phenols decreased with functionalization. The band in 1073 corresponded to a COC stretching in sample 2. This band decreased considerably in sample 1, indicating that there is a breakdown of macromolecules to smaller molecules, which corresponds to the formation of low molecular weight quinones in sample 1.

Figure 3:
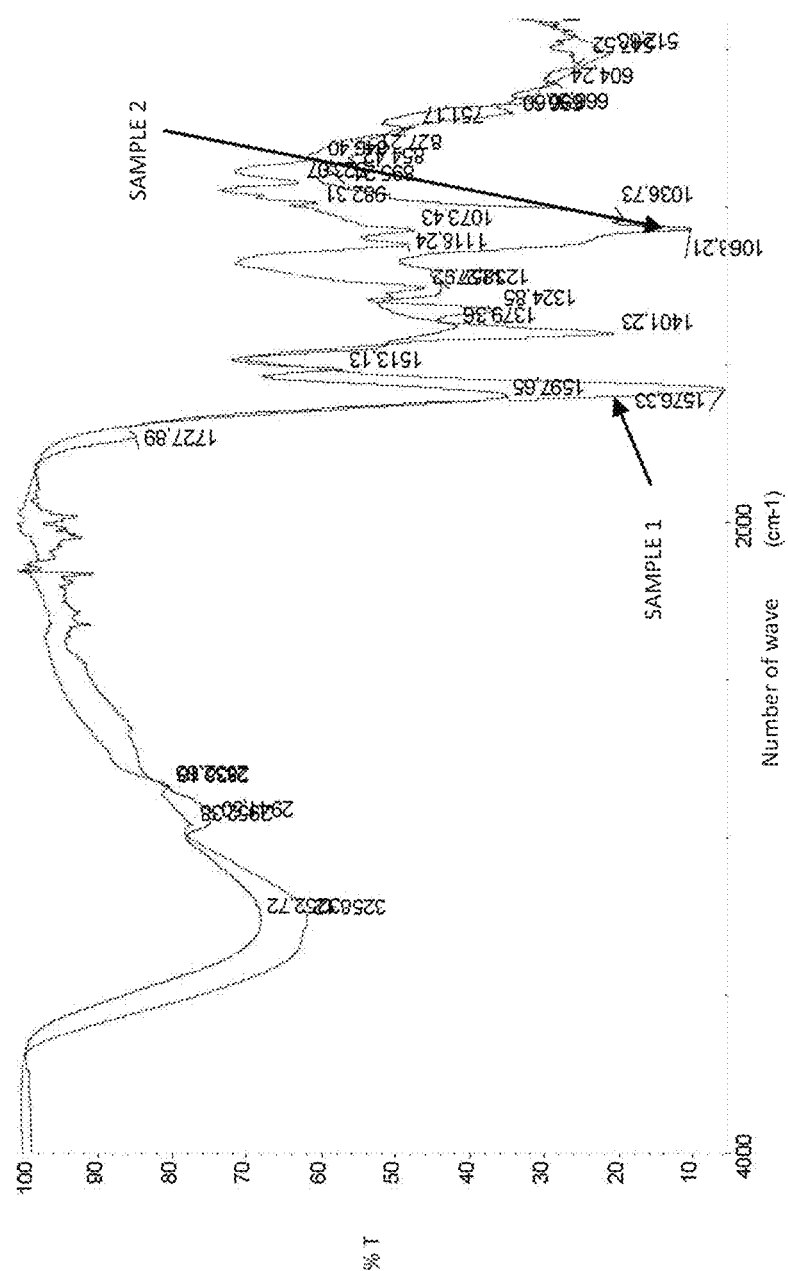
FIG. 3 is a superposition of the IR spectra of the extract of the present invention against a conventional aqueous extract of *Larrea tridentata*.

To make the above mentioned differences more evident, a comparison of the obtained spectra was made as shown in FIG. 3.

The IR spectra of samples 1 and 2 were different from each other. They show a significant increase in the proportion of quinones of NDGA, which is directly related to the presence of disodium EDTA in sample 1.

The functionalized aqueous extract was subjected to a pH measurement test in which the pH of the functionalized aqueous extract was 9.5.

Example 3. In Vitro and In Vivo Tests

The antifungal and antibacterial activity of the extract of the present invention was evaluated in vitro and in vivo.

For the in vitro test against fungi, phytopathogenic fungi of soil and foliar were used as a test organism of the genera *Fusarium* sp., *Alternaria* sp., *Collecotrichum* sp., *Aspergillus flavus*, *Rhizotocnia* sp., *Oidium* sp., *Mycosphaerella fijiensis* and *Hemileia vastratix*. The poisoned medium technique was used, using papa dextrose agar as culture medium. The agar was sterilized for 15 minutes in autoclave and then maintained at 45° C. The sterile agar was added with 2% of the aqueous extract functionalized with disodium EDTA of the present invention. The agar-extract mixture was homogenized in a vortex and poured into Petri dishes. Once the medium solidified at room temperature, the phytopathogenic fungi were inoculated by stinging in the center of each of the plates. The biocidal activity of the extract was determined by measuring the radial growth of the fungus in two crossed diameters from the third day of incubation. The inhibition percentage was determined with the following formula:

% inhibition=[(micellar diameter of the control−micellar diameter with extract)/micellar diameter of the control]*100

Figure 4:
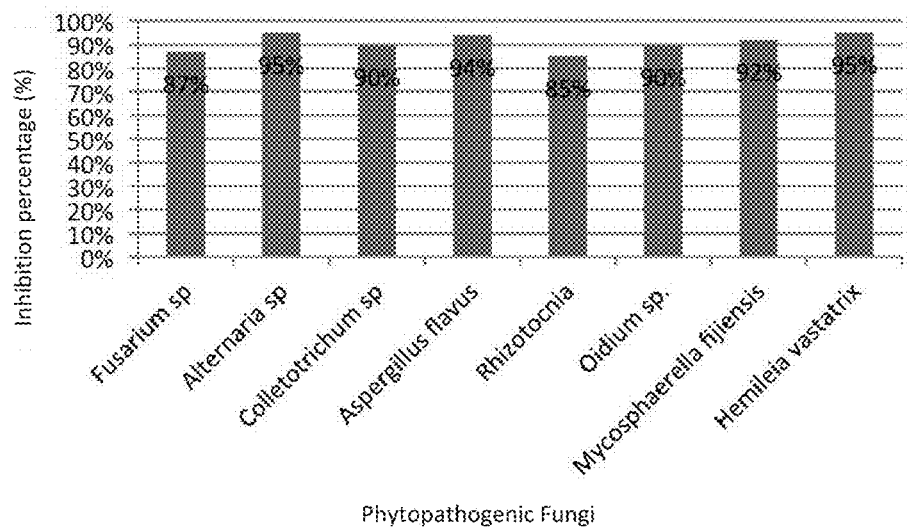
FIG. 4 shows the inhibition percentage on phytopathogenic fungi of the extract of the present invention.

The inhibition percentage achieved was 87% for *Fusarium* sp., 95% for *Alternaria* sp., 90% for *Collecotrichum* sp., 94% for *Aspergillus flavus*, 85% for *Rhizotocnia* sp., 90% for *Oidium* sp., 92% for *Mycosphaerella fijiensis* and, 95% for *Hemileia vastratix* (FIG. 4).

To evaluate the antibacterial activity of the aqueous extract of the present invention, bacteria of the genus *Pseudomona* sp and *Erwinia* sp were used. The poisoned medium technique was used using nutritive agar as a culture medium. The agar was sterilized for 15 minutes and then maintained at 45° C. Subsequently, in a laminar flow hood, 2% of the aqueous extract obtained by the method of the present invention was added to the culture medium. The agar-extract mixture was homogenized in a vortex and poured into Petri dishes. Once the medium solidified at room temperature, 100 µl of bacterial suspension (1×106 CFU/ml) was inoculated and spread with an "L" shaped rod. Petri dishes were incubated at 28° C. for 24-72 hrs. After this time, the number of colonies grown was counted with the help of a colony counting chamber and the percent inhibition was estimated considering the number of control colonies as 0% inhibition.

Figure 5:
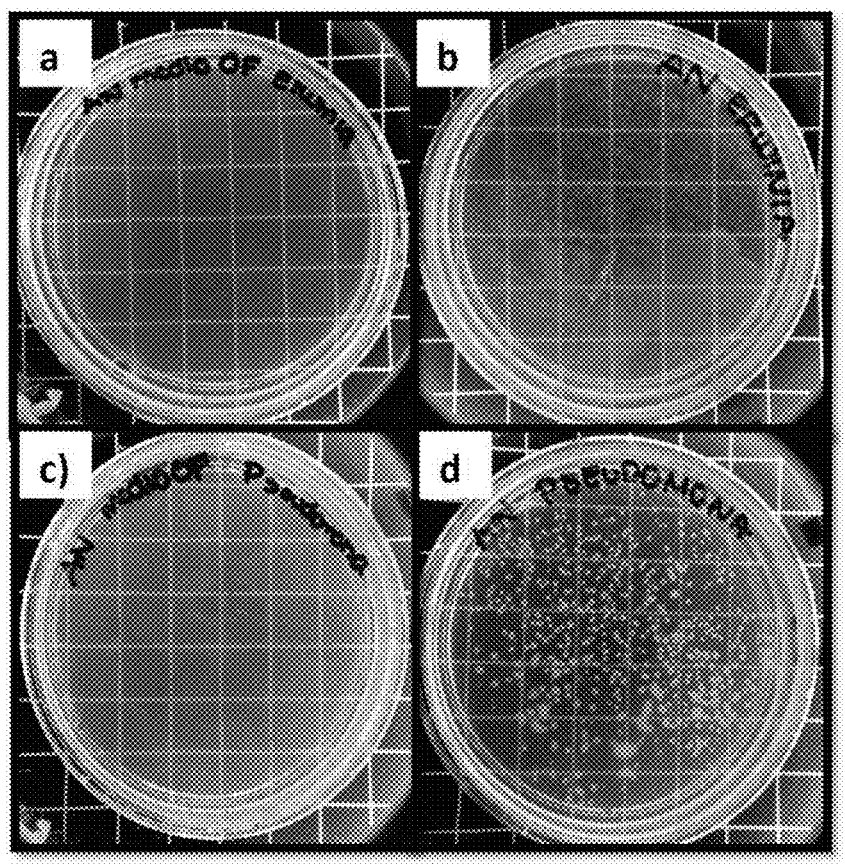
FIG. 5 shows the inhibition percentage for *Pseudomonas* sp and *Erwinia* sp with the extract of the present invention.

As can be seen in FIG. 5, the inhibition percentage for *Pseudomona* sp and *Erwinia* sp is 0%, corroborating a good control and inhibition of the growth of these two phytopathogenic bacteria of agricultural crops.

Figure 6:
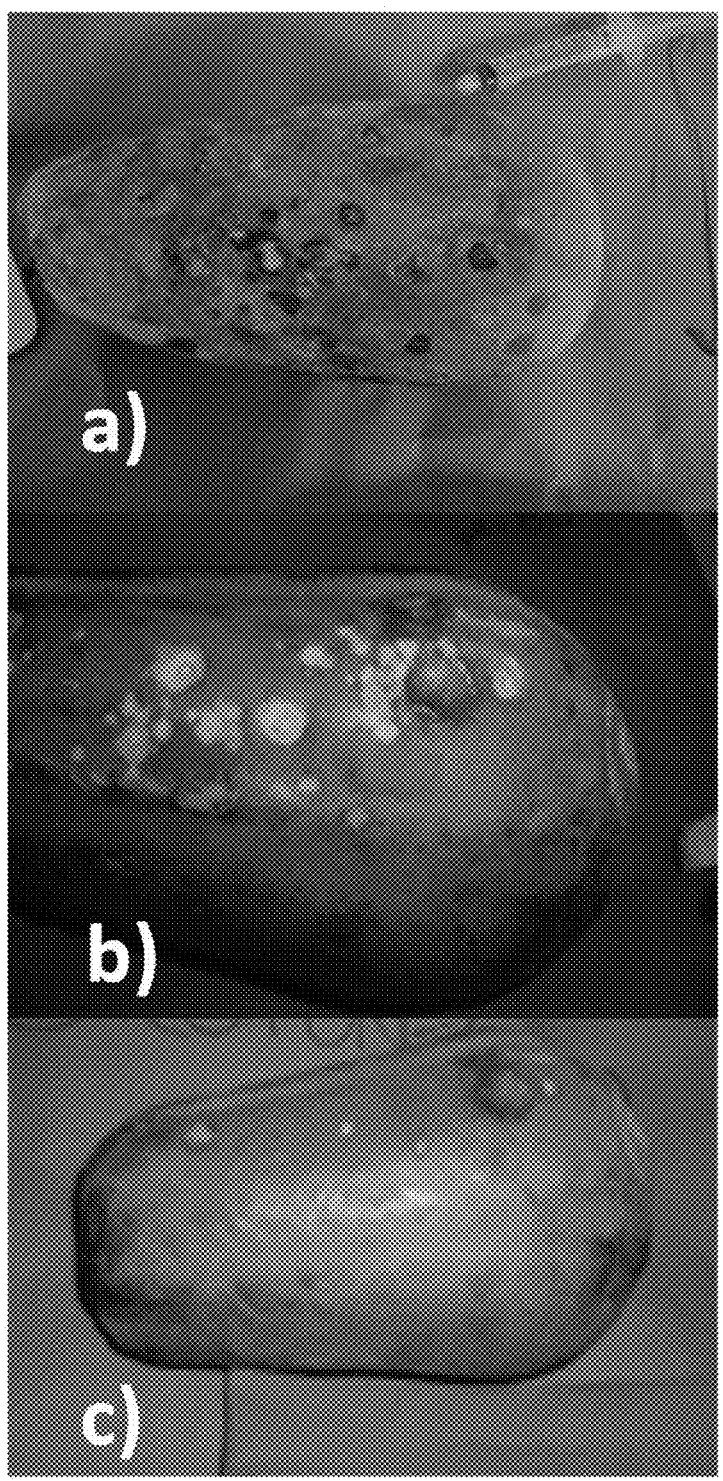
FIG. 6 shows photographs in which the results of the papaya test are observed with the extract of the present invention.

The aqueous extract of the present invention is effective to eliminate from 90% to 95% infections established by phytopathogens in various crops such as papaya, cranberry, raspberry, coffee, chard, avocado, agave, garlic, sesame, artichoke, alfalfa, cotton, amaranth, celery, rice, oats, eggplant, beets, broccoli, cacao, pumpkin, squash, chihua squash, cinnamon, sugar cane, safflower, barley, onion, cherry, apricot, mushroom, chili, pea, cilantro, plum, coconut, cabbage, brussels sprouts, cauliflower, chrysanthemum, peach, string bean, corn, asparagus, spinach, strawberry, bean, chickpea, gerbera, gladiola, gooseberry, guanabana, guava, bean, roselle, kiwi, lettuce, lychee, lime, lemon, tangerine, mango, apple, corn, passion fruit, melon, quince, blackberry, orange, tender prickly pear, walnut, potato, pasture, cucumber, pear, parsley, pepper, pineapple, banana, radish, beet, rose bush, watermelon, sorghum, soy, aloe, tobacco, tamarind, Mexican hawthorn, cherry tomato, tomato red, green tomato, grapefruit, wheat, Indian fig opuntia, grape vine, vanilla and blackberry, among others; however, in order to exemplify their activity, the in-vivo tests were performed on papaya, cranberry, raspberry and coffee crops. In the papaya case, the antifungal activity of the extract was evaluated on phytopathogenic fungi of the genera *Fusarium* sp., *Alternaria* sp. and *Colletotrichum* sp. found on infected papaya fruits. The infected papayas were subjected to treatments consisting of washing with the aqueous extract of the present invention diluted at 2% concentration. The papayas were left to soak for 15 minutes and then they were left to dry on absorbent paper for 10 days. A papaya control was left (panel A) without treatment. Over time a significant remission of fungal infection was observed on the surface of the treated papaya (panel B 5 days and panel C 10 days), while the control papaya was completely covered by the fungus (FIG. 6).

Figure 7:
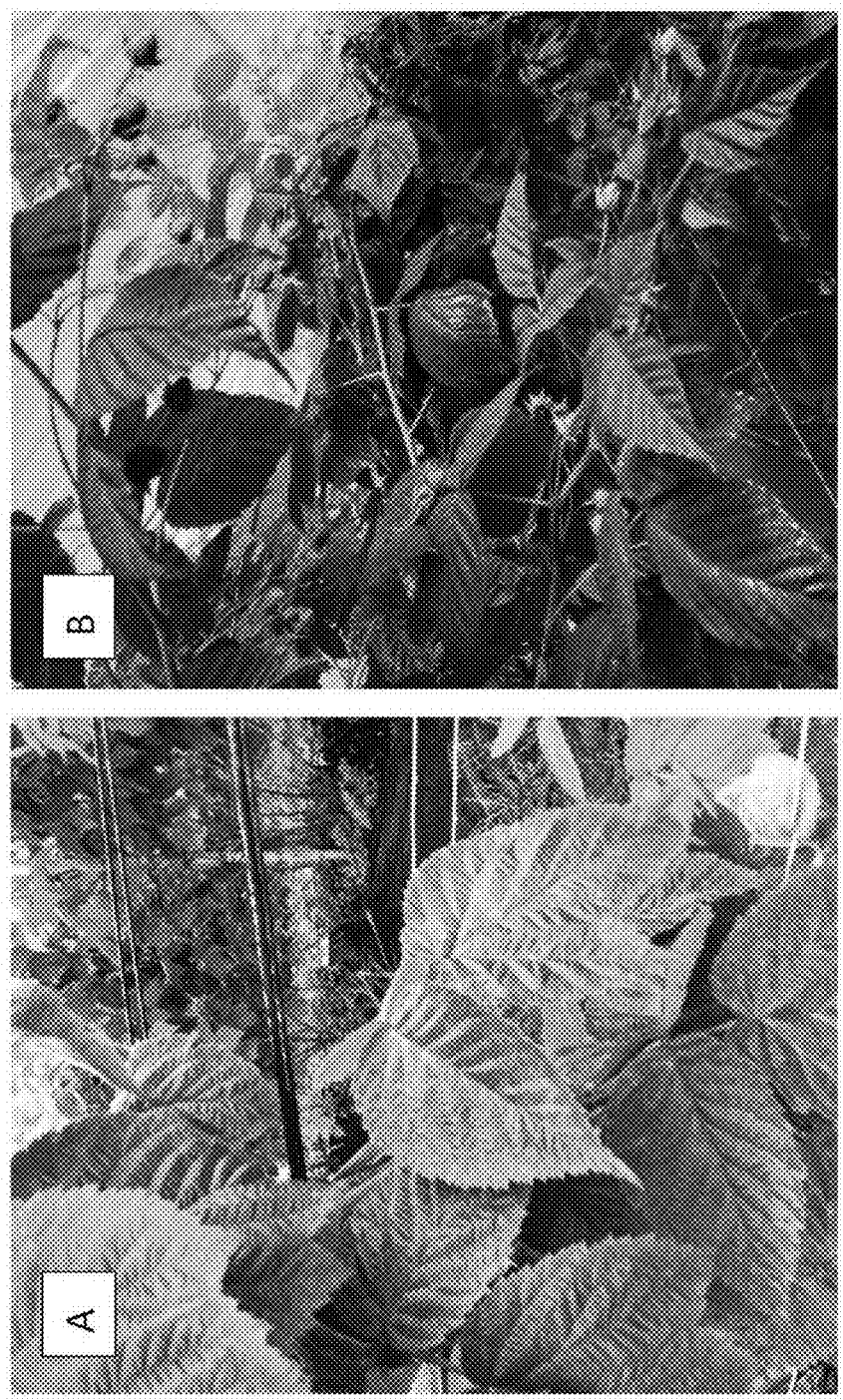
FIG. 7 shows photographs illustrating the difference between the raspberry plants with rust disease before making the application of the extract of the present invention and the treated plants at 30 days after the first application.

In the case of raspberry plants, the extract was evaluated against rust disease caused by the phytopathogenic fungus *Pucciniastrum americanum*. An initial dose of 2 L/Ha was applied. Fifteen days after the first application, a second application of 2 L per Ha was made again. The applications were made with a spray equipment of 20 liters capacity. The result of this treatment on the raspberry plants showed good control over the phytopathogenic fungus *Pucciniastrum americanum*. FIG. 7 shows the difference between raspberry plants with rust disease before applying the functionalized governor aqueous extract (panel A) and the treated plants 30 days after the first application (panel B).

Figure 8:
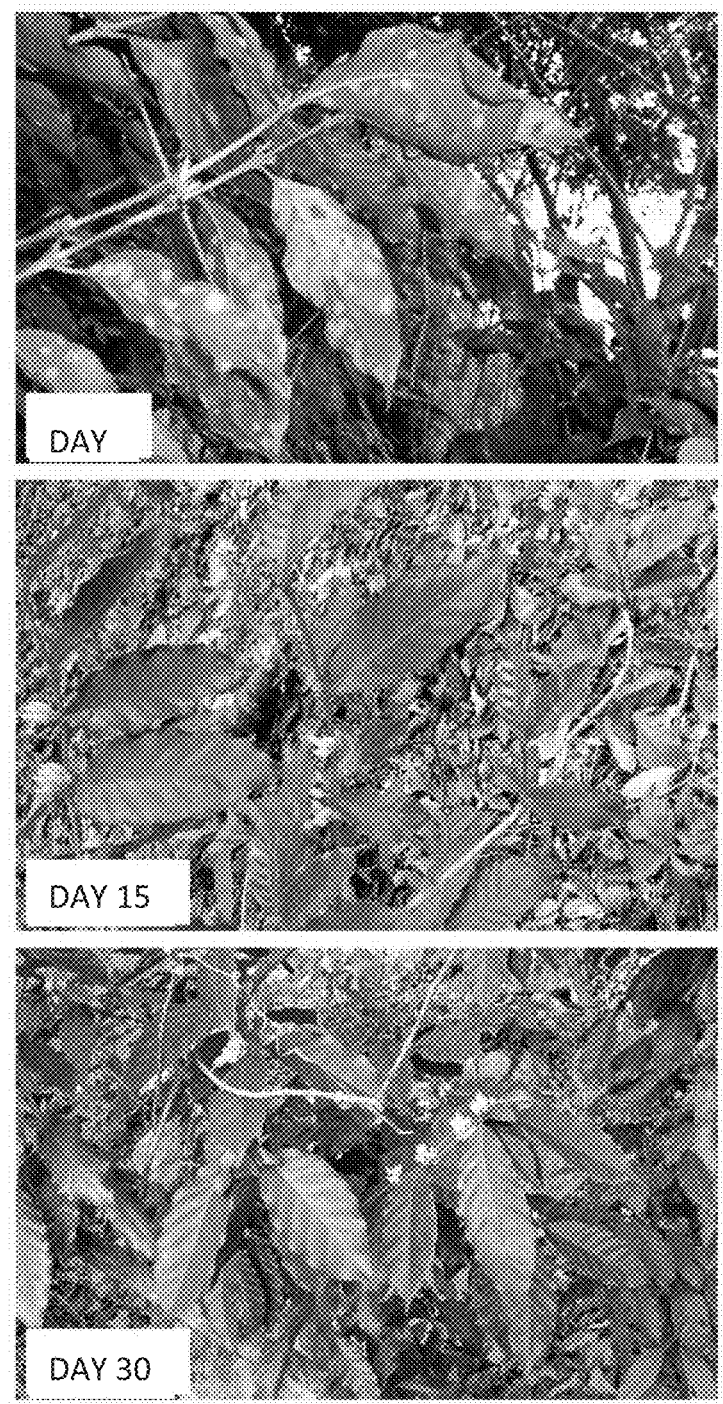
FIG. 8 shows photographs illustrating the effects caused by the extract of the present invention on coffee plants infested by *Hemileia vastratix*.

With the coffee tree, the extract was evaluated as a treatment in plants that presented symptoms of rust disease caused by the phytopathogenic fungus *Hemileia vastratix*. An initial dose of 2 L/Ha was applied. Fifteen days after the first application, a second application of 2 L per Ha was made again. The applications were made with a spray equipment of 20 liters capacity. It was observed that at 15 days after the first application the coffee rust disease decreased by 85% (FIG. 8), in addition to the restructuring of leaf tissue and a coffee tree with more flower. At 15 days after the second application and 30 days after the first application it was observed that coffee rust disease had been controlled 100%. The application of the aqueous extract of the present invention allowed the coffee plant to continue its development without showing negative effects or toxicity.

Figure 9:
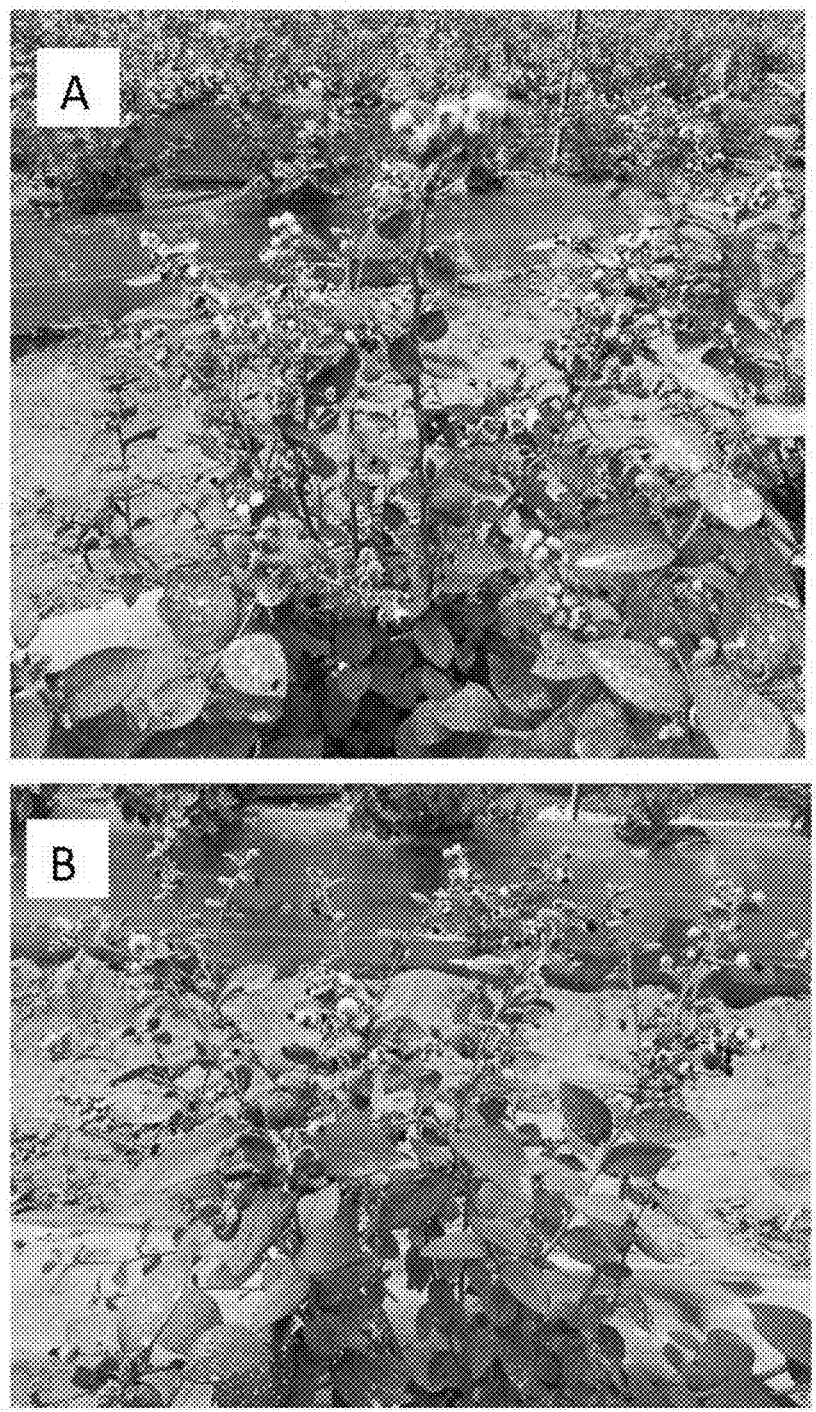
FIG. 9 shows photographs where the differences between a treated and untreated cranberry culture with the extract of the present invention at 20 days are observed.

Finally, the extract was evaluated against the phytopathogenic fungus *Botrytis cinerea*, which affects several agricultural crops, including blueberries. An application of 2 L/Ha of the extract of the present invention was carried out using a 15 liter capacity spraying equipment. FIG. 9 shows the difference between the treated cranberry culture (panel A) and the untreated one (panel B) at 20 days after application. The treated cranberry plants had 50% more fruit than the untreated cranberry plants.

Example 4. Comparative Study of the Present Invention Against a Commercial Product To demonstrate the improved effect of the extract of the present invention versus other commercial extracts, a field test was carried out in a raspberry culture infected by the fungus *Pucciniastrum americanum*. For this, the work was developed as follows:

1.—Raspberry plots infected with the fungus were located.

2.—The application to a plot consisted of the aqueous extract of governor *Larrea tridentata* potentiated with disodium EDTA of the present invention at dose of 2 L/hectare.

3.—The application to another plot consisted of the commercial product PROGANIC MEGA®, which is a product with a concentration of 95% alcoholic extract of governor *Larrea tridentata*. For this product, a dose of 4 L/hectare was used.

4.—Both products were diluted in 800 Liters of water and were applied in their corresponding plot (1 Hectare different per product).

5.—The application of the products was carried out by means of the spraying method using a 20 L aspersion backpack.

5.—It was proceeding to review the effect of both products for the control of the rust after 4 days from the application of the products.

Figure 10:
FIG. 10 shows a photograph in which the appearance of a raspberry culture affected by rust treated with the extract of the present invention is observed.
Figure 11:
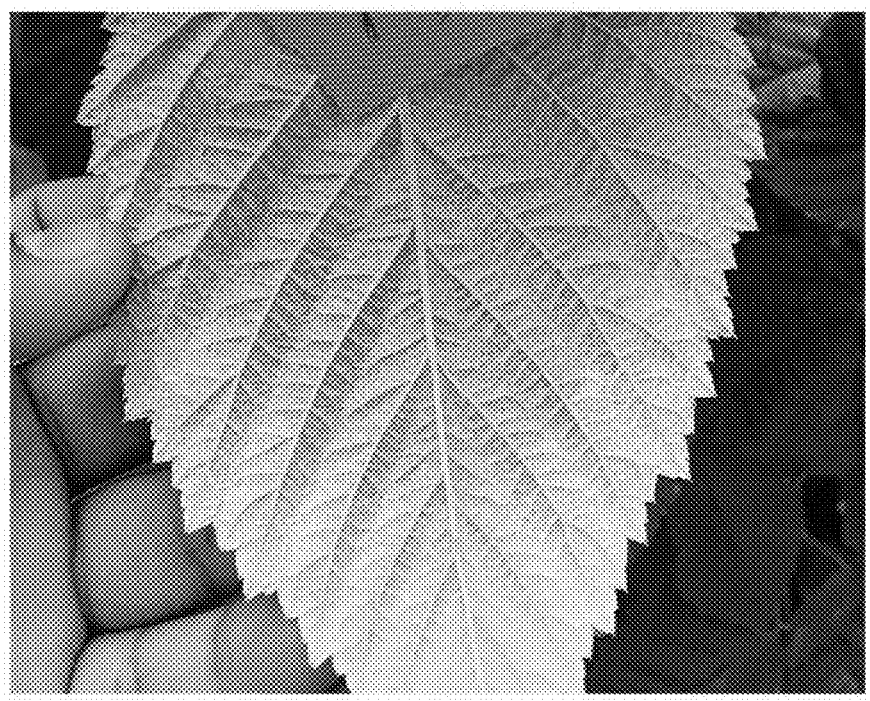
FIG. 11 is a photograph in which the appearance of a raspberry culture affected by rust treated with the commercial product PROGANIC MEGA® is observed.

The effect of the aqueous extract of the present invention was evaluated on the fourth day after application of the product. A control of 90-95% of rust disease in the raspberry culture was observed (FIG. 10). On the other hand, the product PROGANIC MEGA®, at dose of 4 liters per hectare had a control of 70% (FIG. 11). Comparing FIG. 10 with FIG. 11 we can see that the extract of the present invention controlled the raspberry rust in almost its entirety. On the other hand, FIG. 11 shows that, although the disease was controlled, the leaf of the raspberry plant still has a greater amount of orange mold or fungus. Therefore, it can be concluded that even using a lower dose (2 L per Ha) of the extract of the present invention, it has a better control than the commercial product PROGRANIC MEGA® (4 L per Ha) on the phytopathogenic fungus causing of rust in the cultivation of raspberries.

The present invention has been described according to a preferred embodiment; however, it will be apparent to a technician with average knowledge in the matter, that modifications to the invention may be made, without departing from its spirit and scope.

What is claimed is:

1. A method for obtaining an aqueous extract of *Larrea tridentata*, comprising the steps of:
    (a) washing leaves and stems of *Larrea tridentata* with water for a period from 15 to 60 minutes;
    (b) drying the leaves and stems of *Larrea tridentata* at a temperature from 30° C. to 60° C. for 18 to 36 hours to obtain dried plant material;
    (c) adding the dried plant material to a stirring tank with water at a proportion of 3 to 5 weight % of the dried plant material by volume of the water to obtain a mixture, and heating the mixture from 60° C. to 100° C. for a period from 30 to 75 minutes;
    (d) filtering the mixture through a filter having a pore size of from 5 to 10 micrometer to obtain a filtrate; and
    (e) transferring the filtrate to a stirring tank reactor and adding 0.3 to 5 weight % of disodium EDTA by volume of the filtrate, wherein the adding step is carried out with stirring from 150 to 300 rpm for a period from 15 to 20 minutes and maintaining the temperature from 60° C. to 100° C., to obtain an aqueous extract of *Larrea tridentata* that has a pH from 9.2 to 10 and comprises nordihydroguaiaretic acid and quinones of nordihydroguaiaretic acid.

2. An aqueous extract of *Larrea tridentata* obtained by the method of claim 1.

3. A diluted aqueous extract of *Larrea tridentata*, wherein the aqueous extract of claim 2 is diluted at a ratio of 1:400 to be applied to control phytopathogenic agents of crops.

4. A method of controlling phytopathogenic agents of crops, comprising applying an effective amount of the aqueous extract of claim 2.

5. The method of claim 4, wherein the phytopathogenic agents are selected from the group consisting of *Hemileia vastatrix, Leveillula taurica, Erysiphe cichoracearum, Uncinula necator, Fusarium* sp., *Peronospora* sp., *Phoma terrestris, Pucciniastrum americanum, Botrytis cinerea, Pseudomonas* sp., *Erwinia* sp., *Botrytis* spp., *Podosphaera xanthii, Alternaria* sp., *Collecotrichum* sp., *Aspergillus flavus, Rhizotocnia* sp., *Oidium* sp., *Mycosphaerella fijiensis, Phytophthora* spp., *Sphaceloma perseae, Sphaceloma necator, Agrobacterium* spp., *Phyllachora gratissima, Cercospora purpurea, Cercospora capsici, Cephalereus virescens, Capnodium* spp., *Nectria galligena, Rosellinia* spp., *Aspergillus niger, Penicillium* spp., *Puccinia* spp., *Pyrenochaeta terrestris, Sclerotinia* spp., *Stemphylium vesicarium, Uroccystis cepulae, Pythium* spp., *Thielaviopsis* spp., *Xanthomonas* spp., *Pectobacterium* spp., *Plasmodiophora brassicae, Erysiphe cruciferarum, Mycosphaerella capsellae, Mycosphaerella brassicicola, Mycosphaerella melonis, Mycosphaerella fragarie, Verticillium* spp., *Albugo candida, Sphaeroteca* spp., *Phoma* spp., *Phyllosticta citricarpa, Diaporthe citri, Elsinoe australis*, and *Ralstonia* spp.

6. The method of claim 4, wherein the crops are selected from the group consisting of papaya, cranberry, raspberry, coffee, chard, avocado, agave, garlic, sesame, artichoke, alfalfa, cotton, amaranth, celery, rice palay, oats, eggplant, beets, broccoli, cacao, pumpkin, zucchini, chihua squash, cinnamon, sugar cane, safflower, barley, onion, cherry, apricot, mushroom, chili, pea, cilantro, plum, coconut, cabbage, Brussels sprout, cauliflower, chrysanthemum, peach, string bean, corn, asparagus, spinach, strawberry, beans, chickpea, gerbera, gladiola, gooseberry, guava, bean, roselle, kiwi, lettuce, lychee, lime, lemon, tangerine, mango, apple, corn, passion fruit, melon, quince, blackberry, orange, tender prickly pear, walnut, potato, pasture, cucumber, pear, parsley, pepper, pineapple, banana, radish, beet, rose, watermelon, sorghum, soy, aloe, tobacco, tamarind, Mexican hawthorn, cherry tomato, red tomato, green tomato, grapefruit, wheat, Indian fig opuntia, grape vine, vanilla, and blackberry.

* * * * *